(12) United States Patent
Gupta et al.

(10) Patent No.: US 9,042,652 B2
(45) Date of Patent: May 26, 2015

(54) TECHNIQUES FOR CONNECTED COMPONENT LABELING

(71) Applicant: Intel Corporation, Santa Clara, CA (US)

(72) Inventors: Niraj Gupta, Bangalore (IN); Oren Agam, Haifa (IL); Benny Eitan, Haifa (IL); Mostafa Hagog, Kaukab (IL)

(73) Assignee: INTEL CORPORATION, Santa Clara, CA (US)

( * ) Notice: Subject to any disclaimer, the term of this patent is extended or adjusted under 35 U.S.C. 154(b) by 54 days.

(21) Appl. No.: 13/666,913

(22) Filed: Nov. 1, 2012

(65) Prior Publication Data

US 2014/0119657 A1    May 1, 2014

(51) Int. Cl.
*G06K 9/34* (2006.01)
*G06K 9/46* (2006.01)
*G06T 7/00* (2006.01)

(52) U.S. Cl.
CPC ............ *G06K 9/4638* (2013.01); *G06T 7/0081* (2013.01); *G06T 2200/28* (2013.01); *G06T 2207/20141* (2013.01)

(58) Field of Classification Search
CPC .................... G06T 7/0081; G06T 2207/20141
USPC ......................................... 382/164, 173, 180
See application file for complete search history.

(56) References Cited

U.S. PATENT DOCUMENTS 5,848,184 A * 12/1998 Taylor et al. .................. 382/173
2005/0024370 A1 * 2/2005 Munshi ........................ 345/557
2009/0196503 A1 * 8/2009 Sullender ...................... 382/180
2009/0309979 A1 * 12/2009 Yang et al. .................... 348/206
2012/0210056 A1 * 8/2012 Okabe et al. .................. 711/108

OTHER PUBLICATIONS

Dillencourt et al. ("A general approach to connected-component labeling for arbitrary image representations," JACM, vol. 39, No. 2, Apr. 1992, 253-280).*
He et al. ("A Run-Based One-Scan Labeling Algorithm," ICIAR 2009, LNCS 5627, 93-102).*
He et al. ("A Run-Based Two-Scan Labeling Algorithm," IEEE TRansactions on IMage Processing, vol. 17, No. 5, May 2008, 749-756).*
Li et al. ("An Efficient and Low Memory Requirement Algorithm for Extracting Image Component Information," Int'l J. of Advanced Intelligence, vol. 3, No. 2, Jul. 2011, 255-267).*
Rasquinha et al. ("C3L—A Chip for Connected Component Labeling," 10$^{th}$ Int'l Conf. on VLSI Design, Jan. 1997, 446-450).*
Wan et al. ("Symmetric Region Growing," IEEE Trans. on Image Processing, vol. 12, No. 9, Sep. 2003, 1007-1015).*

* cited by examiner

*Primary Examiner* — Yubin Hung
(74) *Attorney, Agent, or Firm* — Kacvinsky Daisak Bluni PLLC

(57) ABSTRACT

An apparatus may include a memory, a processor circuit, and a connected component labeling module. The connected component labeling module may be operative of the processor circuit to determine one or more connected components during reading of an image comprising a multiplicity of pixels from the memory, assign a label to a plurality of pixels of the multiplicity of pixels, generate one or more label connections for a respective one or more labels, each label connection linking a higher label to a lowest label for the same connected component, and write to the memory for each label of the one or more labels a lowest label as defined by the label connection for the each label after a label is assigned to each pixel.

24 Claims, 18 Drawing Sheets

First Hardware Pass
300

Second Hardware Pass
400

500

```
int ConnectedComponentLabeling(
SurfaceIndex *srcImg,
SurfaceIndex *outImg,
SurfaceIndex *LabelCon,
SurfaceIndex *BoundingBox,
SurfaceIndex *CountourPoint, //Point on Contour //for Region of interest
unsigned short X, Y;
unsigned short Width,
unsigned short Height,
unsigned int Mode);

Where :
      SrcImg - Input surface
      OutImage - Output Labeled Image
      labelCon - List of label connection point
      BoundingBox - BoundingBox for each label
      NumOfLabelsUsed - Total number of Labels used in first pass
      X,Y - Start location in the input image
      Width, height - Region to be labeled
      Mode : Mode bits for operation
            Back - Background mode
                  1 - One label for background
                  0 - Background is treated as component.
            MaxValue - Used for background check.

If pixel is greater than MaxValue that it is set
            background.
      Th - Threshold for connection
      Con - Type of connection
            1 - Different connection algorithm can be implemented and
            generate a con map which can be used for finding out the
            connected component. This is to allow generic
            implementation.
            0 - Use Th (threshold) to find the connection.
      8_con : connection type
            0 - four connected component
            1 - Eight connected component
```

```
    LabelCon[0] =0;
    LabelCon[1] =-1;
    If(Mode.Back)
            NextLabel = 1;
    else
            NextLabel = 0;
For(y =0; y < Height; y++){
  For (x =0; x < Width; x++){

If(Mode.Con) //Input is a connection map
      backgrd = (crr == 0x40)
      nearUP = (crr &0x01);
      nearLeft = (crr &0x02);
      nearRight = (crr &0x04);
      nearRightTop = (crr &0x08);
      nearLeftTop = (crr & 0x10) && Mode.8_con
      nearRightRightTop = (crr & 0x20) && Mode.8_con
    }
    else {
      backgrd = crr > Mode.MaxValue
      nearUP = (|up – crr| < Mode.Th) && (Y !=0)
      nearLeft = (|left – crr| < Mode.Th) && (X !=0) && Mode.8_con
      nearRight = (|right – crr| < Mode.Th) && (X < (Width-1))
      nearLeftTop = (|leftTop – crr| < Mode.Th) && (X !=0) && (Y!=0) && Mode.8_con
      nearRightTop = (|rightTop – crr| < Mode.Th) && (X < (Width-1)) && (Y!=0) && Mode.8_con
      nearRightRightTop = (|rightTop – right| < Mode.Th) && (X < (Width-1)) && (Y!=0)
    }
```

*FIG. 6a*

```
If(Y !=0) {
  upLabel = outImg[i][j-1]
}
If(X !=0) {
  leftLabel = outImg[i-1][j]
}

// here we suggest to look at the near top right also to reduce the number of labels.
// We could extend this to see beyond the 1 pixel to the right to reduce the number of labels used
further.

newLabel = !nearLeft & !nearLeftTop & !nearRightTop & !nearUp & !(nearRight &
nearRightRightTop);

if (backgrd && Mode.Back) {
        outImg[i][j] = 0;
        continue;
}
Else {
        Label = -1
        minLabel = -1
        If(newLabel){
                minLabel = NextLabel;
                LabelCon[NextLabel] = NextLabel;
                NextLabel++;
                LabelCon[NextLabel] = -1;
        }
        Else If((Mode.8_con & !backgrd) || (!Mode.8_con & backgrd)) {
                If(nearLeftTop) {
```

*FIG. 6b*

```
                    Label = minLabel
                    tmpLabel = findMinLabel(leftTopLabel)
                    if(tmpLabel !=minLabel){
                            minLabel = min(tmpLabel, Label)
                            if(tmpLabel == minLabel)
                                    updateMinLabel(minLabel, Label)
                            else
                                    updateMinLabel(minLabel, leftTopLabel)
                    }
            }
            If(nearRightTop) {
                    Label = minLabel
                    tmpLabel = findMinLabel(rightTopLabel)
                    if(tmpLabel !=minLabel){
                            minLabel = min(tmpLabel, Label)
                            if(tmpLabel == minLabel)
                                    updateMinLabel(minLabel, Label)
                            else
                                    updateMinLabel(minLabel, rightTopLabel)
                    }
            }
    } else {
            If(nearLeft) minLabel = leftLabel;
            If(nearUp) {
                    Label = minLabel
                    tmpLabel = findMinLabel(upLabel)
                    if(tmpLabel !=minLabel){
                            minLabel = min(tmpLabel, Label)
                            if(tmpLabel == minLabel)
                                    updateMinLabel(minLabel, Label)
                            else
                                    updateMinLabel(minLabel, upLabel)
                    }
            }
            If(nearRight && nearRightRightTop) {
                    Label = minLabel
                    tmpLabel = findMinLabel(rightTopLabel)
                    if(tmpLabel !=minLabel){
                            minLabel = min(tmpLabel, Label)
                            if(tmpLabel == minLabel)
                                    updateMinLabel(minLabel, Label)
                            else
                                    updateMinLabel(minLabel, rightTopLabel)
                    }
            }
        }
    }
    outImg[i][j] = minLabel;

```
}
NumOfLabelsUsed = NextLabel;

-------------------------------------------------
Where :
        findMinLabel(label){
                if(label = -1) return(label)
                tmp = labelCon[label]
                while(tmp < label){
                        label = tmp
                        tmp = labelCon[label]
                }
                return(label);
        } updateMinLabel(minLabel, label){
                if((label == -1) || (minLabel == -1)) return;
                while (minLabel < label) {
                        tmp = labelCon[label]
                        labelCon[label] = minLabel
                        label = tmp
                }
                return;
        }

After the frame is finished :
        //To find connection to the minimum label
        For(i=0; i<NumOfLabelsUsed ; i++){
                MinLabel = findMinLabel(i)
                updateMinLabel(i, MinLabel)
        }
        //reduce the number of labels
        //To pack the label numbers
        j = 1;
        For(i=0; i<NumOfLabelsUsed ; i++){
                If(i == labelCon[i]){
                        nextLabel=j;
                        updateMinLabel(i, nextLabel)
                        j++;
                }
                Else {
                        tmp = labelCon[i]
                        tmp = labelCon[tmp]
                        updateMinLabel(i, tmp)
                }
        }
        NumOfLabelsUsed = nextLabel;
```

*FIG. 6d*

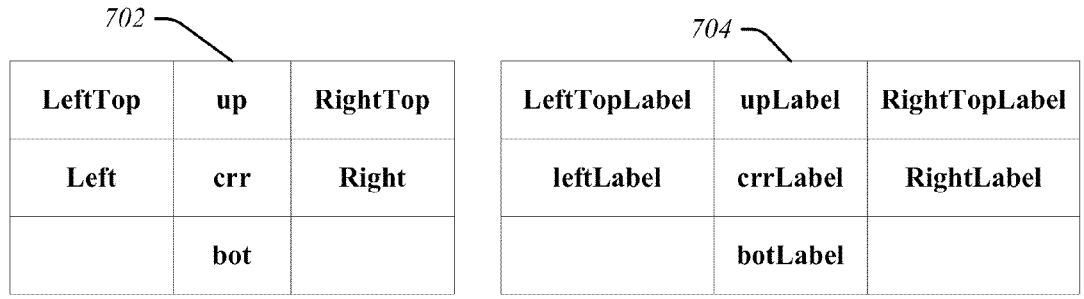
*FIG. 7a*  *FIG. 7b*
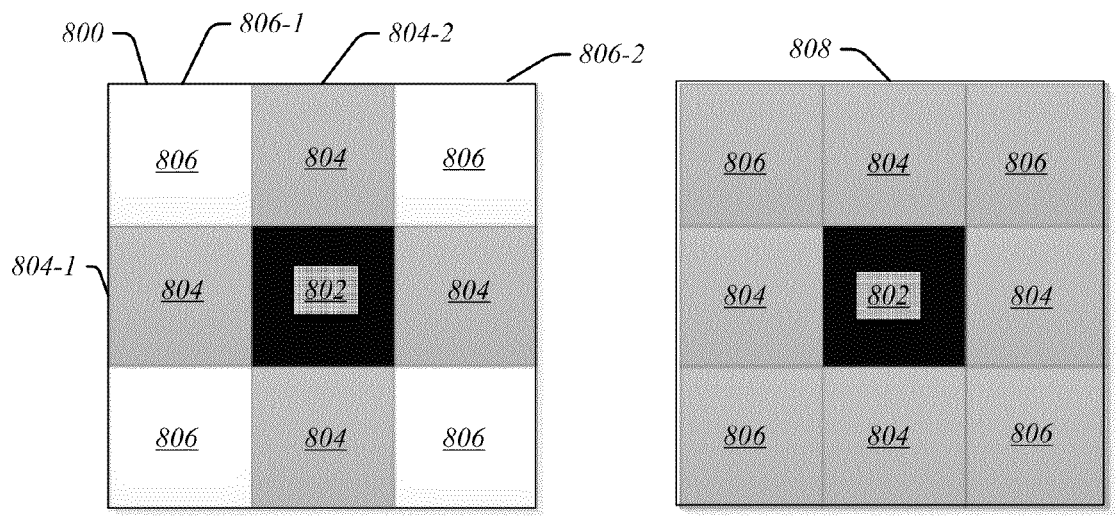
4 Connectivity
8 Connectivity
*FIG. 8a*  *FIG. 8b*

For full image:
The operation is to replace the labels with the lower connected label. First the labeled image is read and for each pixel's label the label connection is read to find out if it is connected to a lower label and if it is then the label is replaced with the lower label.
If required we can have additional data of the contour bounding box also to be output for each label. The bounding box is calculated using the following:

```
For(j =0; j < Height; j++){
  For (i =0; i < Width; i++){
        //Replace Label
        Label = LabelImage[i][j];
        MinLabel = LabelCon[Label]; //Using the mask find the lowest connected label
        If(MinLabel < Label)
              LabelImage[i][j] = MinLabel;
        //If a cache line is not updated then we don't need to writeback to memory.

//Contour Tracking
        [Y,X] = LabelTopLeft[Label]; //Initialized to [2^16-1, 2^16-1]
        If(j < Y && i < X) LabelTopLeft[Label] = [j,i];

//Bounding Box
        // read the Xmin, Ymin, Xmax, Ymax for the label
        {Ymax, Xmax, Ymin, Xmin} = Read_Pos(Label);
        If(j > Ymax) Ymax = j;
        If(j < Ymin) Ymin = j;
        If(i > Xmax) Xmax = i;
        If(i < Xmin) Xmin = i;
        Write_Pos(label) = {Ymax, Xmax, Ymin, Xmin};
   }
}
```

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Label | x | 1 | 2 | 3 | 4 | 5 | 6 | 7 | 8 | 9 | 10 | 11 | 12 | 13 | 14 | 15 |
| State | a | a | a | a | a | a | a | a | a | a | a | a | a | a | a | a |
| Level | 0 | 0 | 0 | 0 | 0 | 0 | 0 | 0 | 0 | 0 | 0 | 0 | 0 | 0 | 0 | 0 |

Level 0 - end

1208

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Label | 0 | 0 | 2 | 0 | 2 | 5 | 5 | 2 | 0 | 2 | 10 | 0 | 0 | 5 | 5 | 2 |
| State | b | c | b | c | c | b | c | c | c | c | b | c | c | c | c | c |
| Level | 0 | 0 | 0 | 0 | 0 | 0 | 0 | 0 | 0 | 0 | 0 | 0 | 0 | 0 | 0 | 0 |

FIG. 12c

Level 1 - start

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Label | 0 | 1 | 2 | 3 | 4 | 5 | 6 | 7 | 8 | 9 | 10 | 11 | 12 | 13 | 14 | 15 |
| State | b | a | b | a | a | b | a | a | a | a | b | a | a | a | a | a |
| Level | 0 | 1 | 0 | 1 | 1 | 0 | 1 | 1 | 1 | 1 | 0 | 1 | 1 | 1 | 1 | 1 |

FIG. 12d

Level 1 - end

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Label | 0 | 0 | 0 | 0 | 5 | 5 | 5 | 0 | 10 | 10 | 10 | 0 | 12 | 12 | 14 | 12 |
| State | b | c | c | c | c | b | c | c | c | c | b | c | b | c | b | c |
| Level | 0 | 1 | 0 | 1 | 1 | 0 | 1 | 1 | 1 | 1 | 0 | 1 | 1 | 1 | 1 | 1 |

FIG. 12e

Level 2 - start

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Label | 0 | 1 | 2 | 3 | 4 | 5 | 6 | 7 | 8 | 9 | 10 | 11 | 12 | 13 | 14 | 15 |
| State | b | a | a | a | a | b | a | a | a | a | b | a | b | a | b | a |
| Level | 0 | 2 | 2 | 2 | 2 | 0 | 2 | 2 | 2 | 2 | 0 | 2 | 1 | 2 | 1 | 2 |

FIG. 12f

Level 2 - end

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Label | 0 | 2 | 2 | 2 | 14 | 5 | 0 | 7 | 7 | 12 | 5 | 11 | 12 | 13 | 14 | 15 |
| State | b | c | b | c | c | b | c | b | c | c | c | a | b | a | b | a |
| Level | 0 | 2 | 2 | 2 | 2 | 0 | 2 | 2 | 2 | 2 | 0 | 2 | 1 | 2 | 1 | 2 |

US 9,042,652 B2

TECHNIQUES FOR CONNECTED COMPONENT LABELING

BACKGROUND

In present day connected component labeling and contour tracking are widely deployed for computer vision and video analytics applications. The connected component is particularly used to detect connected regions within a binary digital image. The connected component technique analyzes an image and labels the image according to defined rules for connection, with each component being assigned a distinct label. In one example, connected component labeling scans an image, pixel-by-pixel in order to identify connected pixel regions where the connected component is defined by regions of adjacent pixels which share the same set of intensity values. The number of distinct connected components in the image is defined by the number of labels used in the image excluding the background. The contour tracking technique that may be applied in conjunction with connected component analysis includes two components: a bounding box that circumscribes and an ordered list of boundary pixels of each component.

There are various software solutions for doing connected component and contour tracking. One approach employed in connected component labeling is to scan an image and assign labels to each pixel until the labels for the pixels no longer change. This approach is slow because the labels propagate one layer in an iteration. One strategy to speed up this process is to employ a two-pass algorithm. This two pass algorithm uses a data structure to record label equivalence information. It scans the image once to assign provisional labels and discover the label equivalence information, and scans the image a second time to assign the final labels.

An additional problem associated with present day connected component and contour tracking approaches is the use of excessive cache memory and the frequent need to read an entire image more than once to complete the analysis.

Accordingly, there may be a need for improved techniques and apparatus to solve these and other problems.

BRIEF DESCRIPTION OF THE DRAWINGS

FIG. 5 depicts an example of a software call that may be implemented in the present embodiments.

FIGS. 6a to 6d provide an example of a procedure consistent with various embodiments.

FIG. 7a illustrates a table that provides definitions or naming conventions used by the procedures shown in FIGS. 6a-6d.

FIG. 7b illustrates a table that provides definitions of the labels for the various pixels as defined in FIG. 7a.

FIGS. 8a and 8b illustrate the geometry for determining connectedness of a pixel for 4-connected and 8-connected schemes, respectively.

FIG. 9 provides an example of a procedure consistent with various embodiments.

FIGS. 12a to 12f depict another example of operation of an exemplary buffer.

DETAILED DESCRIPTION

Various embodiments are directed to enhancing the efficiency of processing digital images. Some embodiments are related to computer vision and/or video analytics in which images are analyzed using "connected component" techniques.

In particular embodiments, a hardware architecture is provided to perform various tasks related to connected component analysis. The hardware architecture may be included in a processor such as a graphics processor to provide a more efficient manner of labeling connected components in an image. In particular embodiments a hardware primitive is provided to perform such tasks as connected component labeling, determination of bounding boxes for each connected component to assist in contour tracking, and the determination of a pixel position at the edge of each contour. A hardware primitive is a component that is typically used to draw hardware characters or give control commands to a hardware device. In the present embodiments, and as detailed with respect to the FIGs. to follow, the hardware primitive may perform the above tasks by implementing a two pass procedure in hardware.

Figure 1:
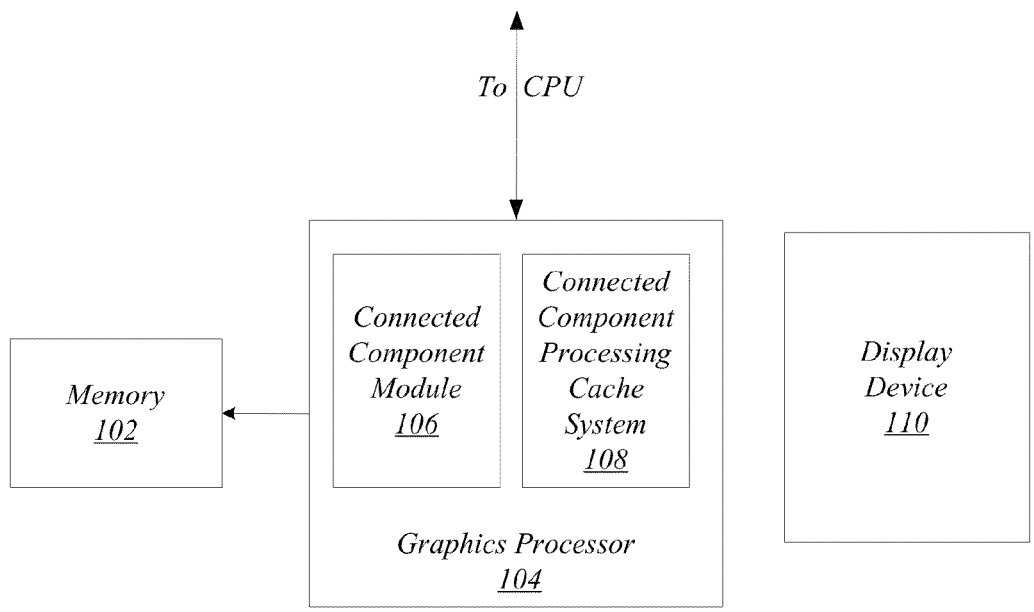
FIG. 1 depicts a block diagram of an embodiment of a system.

FIG. 1 depicts a block diagram of an embodiment of a system 100. As illustrated, the system 100 includes a memory 102, graphics processor 104, and display device 110. The graphics processor 104 may perform analysis on images for presentation on the display device 110. In particular, in various embodiments the graphics processor 104 may include various hardware elements as well as combination of hardware and software elements. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

In particular embodiments, the graphics processor 104 may include components to perform various tasks related to connected component analysis. In the embodiment of FIG. 1, the graphics processor 104 includes a connected component module 106 whose operation is detailed below. In brief, the connected component module 106 may include logic to perform tasks such as connected component labeling, bounding box generation, and contour tracking (also known as "contour tracing"). In order to efficiently perform such tasks, the graphics processor 104 may further include a connected component processing cache system 108 whose operation is further detailed in the FIGs. to follow. The connected component processing cache system 108 may constitute one or more different storage components including one or more caches and buffers.

Figure 2:
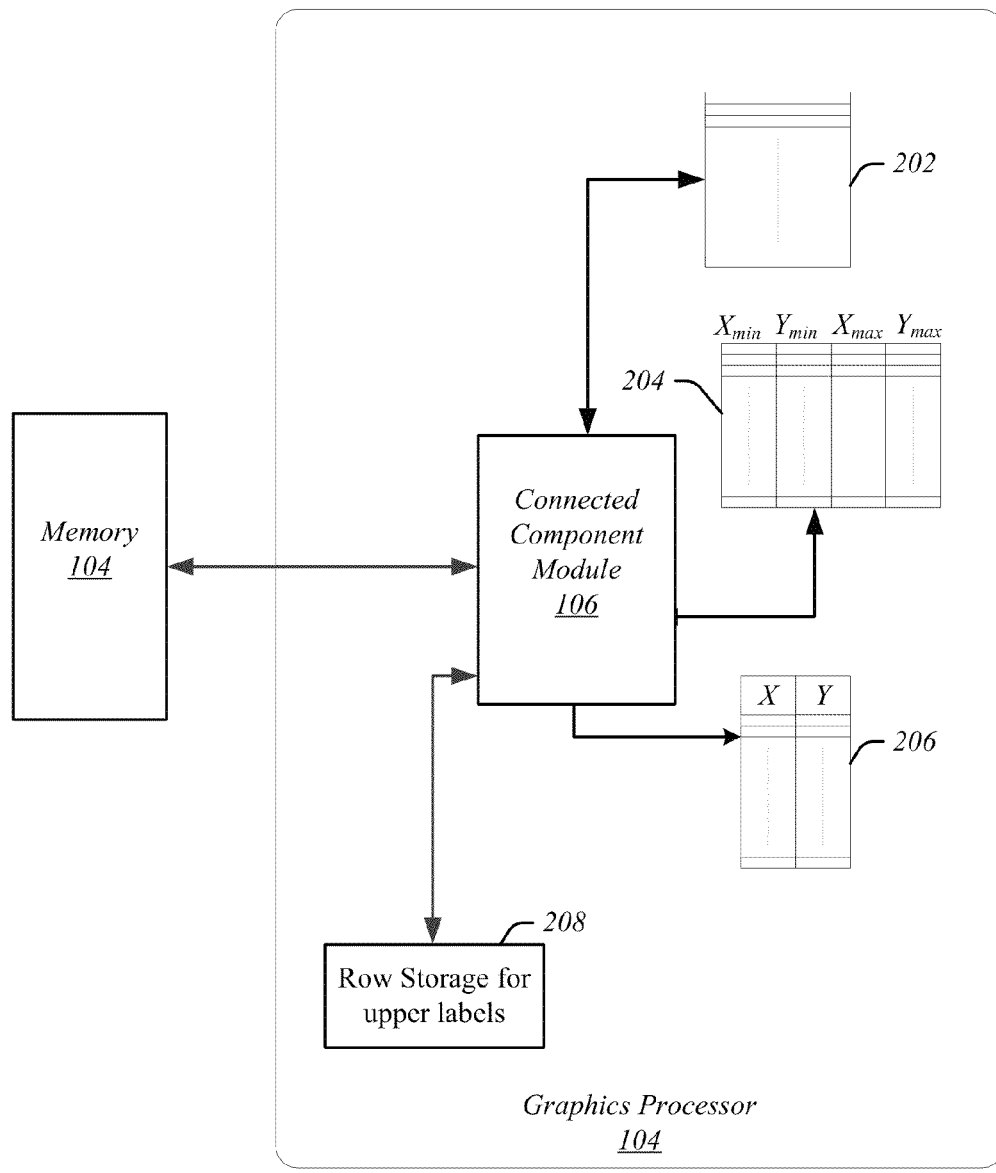
FIG. 2 depicts a block diagram providing details of an exemplary graphics processor.

FIG. 2 depicts a block diagram providing further details of the graphics processor 104 consistent with various embodiments. As illustrated, the connected component module 106 is coupled to various cache and buffers, which may form part of the connected component processing cache system 108. In one embodiment, a label connection buffer/cache 202 is provided to store label connections as connected component labeling proceeds for an input image. The graphics processor 104 may also contain a bounding box buffer/cache 204, contour edge buffer 206, and row storage buffer 208.

Figure 3:
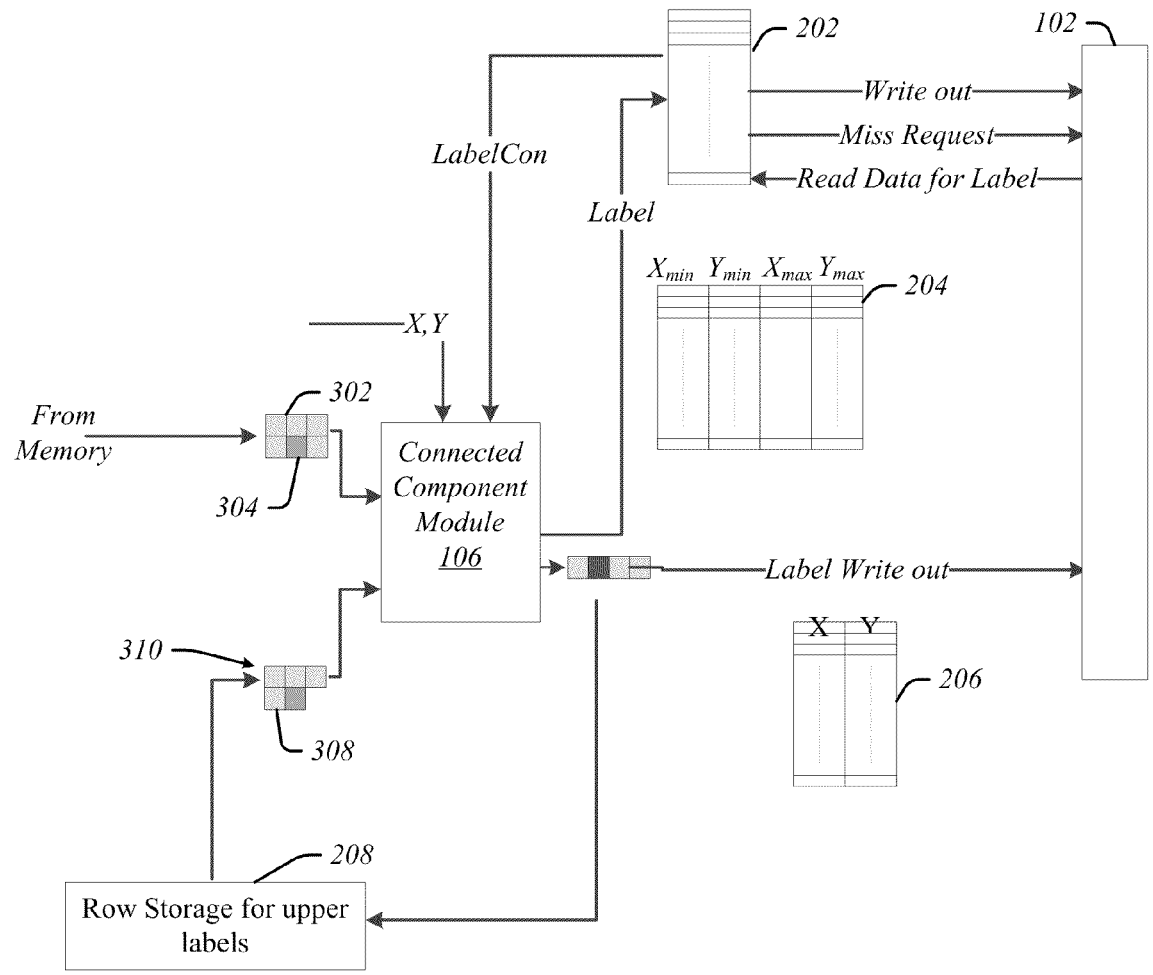
FIG. 3 and FIG. 4 together depict one example implementation consistent with the present embodiments.
Figure 4:
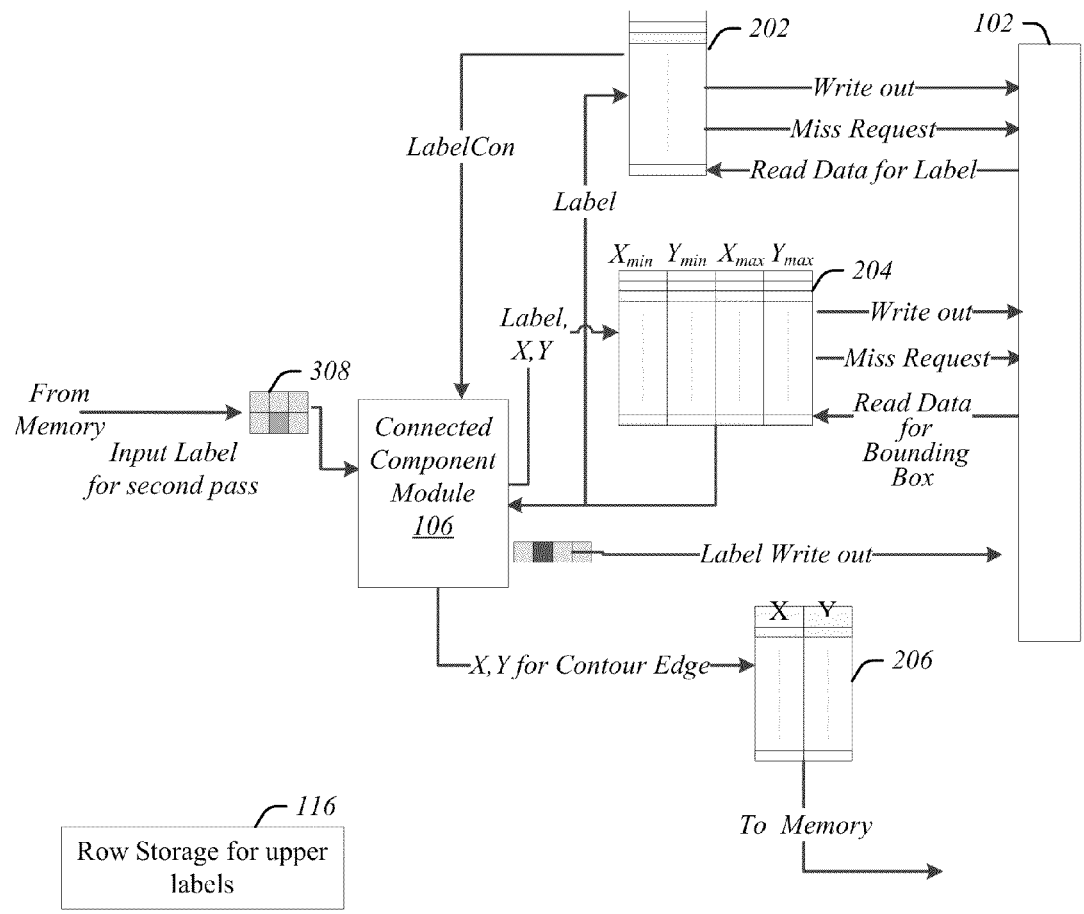

FIG. 3 and FIG. 4 together depict one example of implementing connected component analysis consistent with the present embodiments. In FIG. 3 there is shown exemplary operation of a first hardware pass 300 for implementing connected component labeling, bounding box generation, and contour edge analysis. As generally depicted in FIG. 3, in the first hardware pass 300, an input image is labeled according to defined connected components, and label connections are generated for the input image. As detailed below, a label connection represents a connection between a higher level label and lower level label that may already be assigned to the connected component associated with the higher level label. In addition to generating label connections, the first hardware pass 300 may perform operations to update the label connection after an initial processing of a frame is complete. Accordingly, a lowest level label may be written to memory 102 to represent the label number for a given connected component.

As particularly shown in FIG. 3, during the first hardware pass 300 an image (or frame) may be read into the connected component module 106 for labeling. An X,Y input may be received by the connected component module 106 representing the starting point of the input image, as illustrated in FIG. 3.

FIG. 3 illustrates an image portion 302 that includes a block of six pixels including a pixel to be processed by the connected component module 106. As is the case in known procedures, every pixel of an input image may be checked in accordance with a predetermined sequence. In one example, pixels may be loaded one by one starting at a top left corner of a group of pixels and proceeding to a bottom left corner. Accordingly, during the labeling of an input image as illustrated by the image portion 302, for a given pixel 304, the pixels to the top and left may already have been processed. As the image is read, one or more connected components may be labeled. The top row 310 of the label pixels 308 may be cached such that it is not fetched again during the labeling process.

As is known, during the labeling process, a connected component may receive multiple labels, for example, a "2", "4" and "8." In this example, the labels "4" and "8" are redundant with the label "2" since all refer to the same connected component. In known procedures, the situation in which a connected component has multiple labels may be addressed by re-reading an image to perform corrections before generating a final output labeled image. However, an advantage provided by the embodiment of FIGS. 3 and 4, is that the image is read only once in the first hardware pass 300. FIG. 5 depicts an example of a software call that may be implemented to the connected component module 106.

As shown in FIG. 3, in addition to labeling the input image, the connected component module may generate a label connection that is temporarily stored in the label connection buffer/cache 202. When a labeling connection is determined by the connected component module 106, the labeling connection may be the sent for storage in the label connection buffer/cache 202. FIGS. 6a to 6d discussed below provide an example of a procedure 600 to implement the first hardware pass 300 including in particular the generating of the label connection is provided in. The procedures disclosed in FIGS. 6a to 6d may represent pseudocode, and do not necessarily constitute executable program instructions to be implemented by the connected component module 106.

In the implementation of a first hardware pass 300 illustrated in FIGS. 6a-6d, the connected component analysis proceeds using "up" and "left" pixels with respect to the pixel being processed. The background portions of an image may be assigned a single label, namely "zero" (0). However, in some implementations, the background may be treated as a separate contour and may be assigned multiple labels accordingly. The procedure 600 of FIGS. 6a-6d also assumes a label size of 16 bits. However, other embodiments in which the label size is 8 bits or 32 bits are possible depending on the requirement.

FIG. 7a illustrates a table 702 that provides definitions or naming conventions for the treatment of the various pixels by the procedures shown in FIGS. 6a-6d. The pixel being processed is termed "crr" and the naming of various other pixels is illustrated. FIG. 7b illustrates a table 704 that provides definitions of the labels for the various pixels as defined in FIG. 7a.

As further illustrated in FIG. 3, during the first hardware pass, the connected component module processes each input pixel and forwards labels to the label connection buffer/cache 202. The label connection information may be subsequently retrieved by the connected component module 106 as further shown in FIG. 3. Consistent with various embodiments, the connected component labeling for generating the labels may proceed based upon four connectedness or eight connectedness of a pixel in question. FIGS. 8a and 8b illustrate the geometry for determining connectedness of a pixel for 4-connected and 8-connected schemes, respectively. The pixel arrangement 800 shown in FIG. 8a constitutes a block of nine pixels in a square array in which the object pixel 802 occupies the central pixel position. All the other pixels of the pixel arrangement 800 are directly connected to the object pixel 802, either by sharing a common edge or by sharing a corner. In a connected component determination based on identifying 4-connected pixels, only pixels sharing a common edge with the pixel in question are considered to be connected to the pixel in question. Thus, the four pixels 804 occupying the positions "Left," "Right," "up," and "bot" form a group of 4-connected pixels with respect to the object pixel 802. The four pixels 806 that only share a corner with the object pixel 802 are not considered as connected under this scheme.

In the embodiments generally depicted in FIG. 3, the input may be a connection map in which each input pixel has an associated connection map that may be represented by an 8-bit structure in one implementation. In one example, a right connection is represented by "1", a bottom right connection is represented by "2", a bottom connection is represented by "3", a bottom left connection represented by "4", and so forth.

Turning now to FIG. 8b, for the purposes of comparison, the pixel arrangement 808 constitutes the same block of nine pixels as in pixel arrangement 800 in the square array, in which the object pixel 802 occupies the central pixel position. In a connected component determination based on identifying 8-connected pixels, pixels sharing a common edge with the pixel in question are considered to be connected to the pixel in question, as well as those sharing a common corner or vertex. Thus, the four pixels 804 occupying the positions "Left," "Right," "up," and "bot" form part of the group of 8-connected pixels with respect to the object pixel 802. In addition, the four pixels 806 that only share a corner with the object pixel 802 form part of the group of 8-connected pixels with respect to the object pixel 802.

For implementations in which the connected component module 106 employs a 4-connected procedure to generate label connection, the following scenario may take place. In a first instance the connected component module determines whether the pixel 804-1 meets criterion for being considered part of the same connected component as that of object pixel 802. In different implementations, the pixels 804-1 and 802 may be compared to determine whether any difference between the pixels meets a threshold, or a prior comparison of pixels may be performed to find a connection between pixels in which case a connection map may be sent as the input image rather than the image itself. The ability to send the connection map gives flexibility for any algorithm to be developed to determine the connection between pixels. This avoids changes in the hardware primitive for different algorithms and still supports any implementation to determine the connection map.

In one example in which pixels 804-1 and 802 are compared, a criterion may be an intensity value (or simply "value"). Thus, if the pixel 804-1 has the same value as the object pixel 802 the connected component module 106 assumes that the object pixel 802 belongs to the same region (connected component) as that of pixel 804-1. A similar procedure may be applied to determine if object pixel 802 belongs to the same region as pixel 804-2, that is, if a connection is found between the object pixel 802 and pixel 804-2.

Consistent with the present embodiments, in the case of 4-connectivity, the left and top pixels are both evaluated in with respect to an object pixel. In case the object pixel is connected to either the left pixel or the top pixel but not both the object pixel is labeled with that of the pixel to which a connection is found. If a connection to both left and top pixels is found, in accordance with the present embodiments, the object pixel is labeled with that of the pixel having the lowest label to which the object pixel is connected. In case the object pixel is not connected to either left or top pixels, a new label is generated for the object pixel.

In an implementation that uses 8-connectedness to label an image, an analogous procedure may be employed to that as for the 4-connected implementation to generate labels, except that the procedure additionally considers the pixels at LeftTop and RightTop positions, that is, pixels, 806-1 and 806-2, respectively.

In further embodiments, the connected component analysis may extended to check pixels beyond nearest neighbor pixels, which may facilitate reducing the number of labels used. For example, an "outer" pixel located beyond the first pixel to the right of a pixel being processed may be analyzed.

Referring again to FIG. 3, as the labeling of the input image proceeds, label connection entries may be stored to the LabelConnection buffer/cache 202. As noted, a label connection entry provides the connection of a higher label to a lower label already assigned to the same component. Once the processing of pixels in an image frame is completed, the connected component module 106 may read the LabelConnection buffer/cache 202 to read the one or more label connection entries that were generated for the image during the first hardware pass 300. The entries of the LabelConnection buffer/cache 202 may then be updated so that each entry reflects the lowest label connected to a given entry.

In order to update the LabelConnection buffer/cache 202 in an efficient manner, label connection reading may proceed from the lowest label number to higher label number. As further shown in FIG. 3, after the LabelConnection buffer/cache 202 is updated, entries from the LabelConnection buffer/cache 202 may be written out to the memory 102. More particularly, the lowest label for a component as indicated by a label connection entry is written out to the memory 102 as the label number to be replaced for the present label. One more set of processing on the LabelConnection buffer/cache may be added to reduce the number of labels used to avoid gaps between numbering of labels.

Turning now to FIG. 4 there is shown an exemplary set of procedures for implementation of the second hardware pass 400 that completes a two-pass connected component labeling procedure using a processor such as the graphics processor 104. Continuing with the example of the first hardware pass 300, in FIG. 4 during the second hardware pass 400, the labeled image generated from the first hardware pass 300 is read from the memory 102. In addition, the label connection information stored in memory 102 in the first hardware pass 300 is read back to the connected component module 106. In the second hardware pass, the connected component module 106 may also employ the label connection information loaded from memory 102 to determine if any higher number labels are associated with a component that are assigned a lower label. If so, the higher number label(s) is replaced with the lowest label as indicated by the label connection information.

In particular, the label connection associated with the label of each pixel is read to determine if the pixel label is connected to a lower label. When a connection for a currently stored label for a pixel is found to a lower label, the currently stored label is replaced by the lower label as indicated by the label connection loaded from memory 102.

In addition, during the second hardware pass 400 the connected component module 106 may generate a contour bounding box (bounding box) according to the updated label information generated in the first hardware pass 300. The connected component module 106 may also generate a set of coordinates to indicate the position of the contour edge as discussed below. FIG. 9 depicts an example of instructions to implement the second hardware pass 400, again showing pseudocode that does not necessarily constitute executable program instructions to be implemented by the connected component module 106.

As detailed in FIG. 4, the bounding box information generated by the connected component module 106 may be stored to the bounding box buffer/cache 204. A bounding box for a connected component generally represents a smallest polygon such as a that can circumscribe a connected component. The minimum and maximum co-ordinates of rows and columns of the identified object obtained from connected component analysis are extracted and a rectangular bounding box is drawn around it using these co-ordinates. In the implementation of the second hardware pass 400 illustrated, a bounding box may be drawn for each label. The bounding box buffer cache 204 may thus store a series of bounding boxes defined by a set of values that may be termed Xmin, Ymin, Xmax, and Ymax, as shown in FIG. 4.

As also shown in FIG. 4, in the second hardware pass 400, the connected component module 106 also sends data to the contour edge buffer 206, which may represent spatial coordinates of a specific position in the contour of each label that is written out in the second hardware pass. In one implementation, the X,Y coordinates sent to the contour edge buffer represent the top left pixel position of the contour edge for each contour. This information may then be used to locate the edge position for the complete contour in question. An advantage of the two-hardware-pass implementation for connected component labeling and analysis shown in FIGS. 3 and 4 is that contours of any shape may be tracked. The size of cache to be employed may vary according to design requirements.

In accordance with various embodiments, the LabelConnection buffer/cache 202 may be composed of a running buffer that stores label connection information relative to current labels being used, and a label connection cache that caches the label connection information not covered by the running buffer, which may allow the label connection cache to be relatively small in some implementations. Moreover, the bounding box buffer/cache 204 may contain a similar set of storage devices in which the bounding box relative to current labels being used is stored in a running buffer and bounding box information not covered by the running buffer is placed in a bounding box cache.

Although the embodiments detailed herein with respect to FIGS. 3 and 4 may facilitate more efficient connected component labeling for images that generate up to a very large number of labels, in some types of images the number of labels used to label an image is typically very low. Accordingly, in additional embodiments, the architecture and labeling procedure generally disclosed with respect to FIGS. 3 and 4 may be modified to facilitate efficient image analysis when few labels are used. In particular embodiments, the label connection storage may be performed by a so-called content addressable memory (CAM) architecture. Unlike memory such as random access memory (RAM) in which the user supplies a memory address and the RAM returns the data word stored at that address, a CAM is designed such that the user supplies a data word (element) and the CAM searches its entire memory to see if that data word is stored anywhere within the CAM memory. If the data word is found, the CAM returns a list of one or more storage addresses where the word was found and may return the word. Because a CAM is designed to search its entire memory in a single operation, it is much faster than RAM in virtually all search applications. Accordingly, in embodiments that employ a CAM for label connection buffer/cache, the access time for finding and updating label connection information may be reduced.

In particular, in embodiments employing a CAM for a label connection buffer/cache the updating of labels may proceed generally as described above with respect to FIGS. 3 and 4 until a maximum in the number of labels that can be supported by the label connection buffer/cache is reached. Once the maximum is reached, a reconciliation process is performed to optimize the labels. The label image complete at this point is read and replaced with the lowest label. A result of this process is that the labels which are no longer in use become freed up and are available for use by the connected component module 106 while labeling of the image proceeds. The labeling of the image then continues for the remainder of the image not previously labeled. During the process of labeling the image, a mark can be stored that denotes the point at which labels have been updated when the reconciliation process commences. Subsequently, when the maximum level of labels maximum in the number of labels that can be supported by the label connection buffer/cache for the label is again reached, the next reconciliation process may begin at the point denoted by the mark that indicates the point to which previous label processing had reached.

In particular embodiments, a CAM architecture may be employed as a label connection buffer that can be accessed in two ways: 1) as a conventional random access memory ("memory mode") where access is provided by supplying an address and 2) as a CAM structure ("CAM mode") in which access is provided by content. In one example, the CAM is initialized so that the maximum level of labels allowed is written to all entries. This may be performed in a single access to memory in the memory mode. Updating may then be performed in a CAM mode so that all entries pointing to a lowest label ("Min") may be updated in parallel in a single clock.

Figure 10:
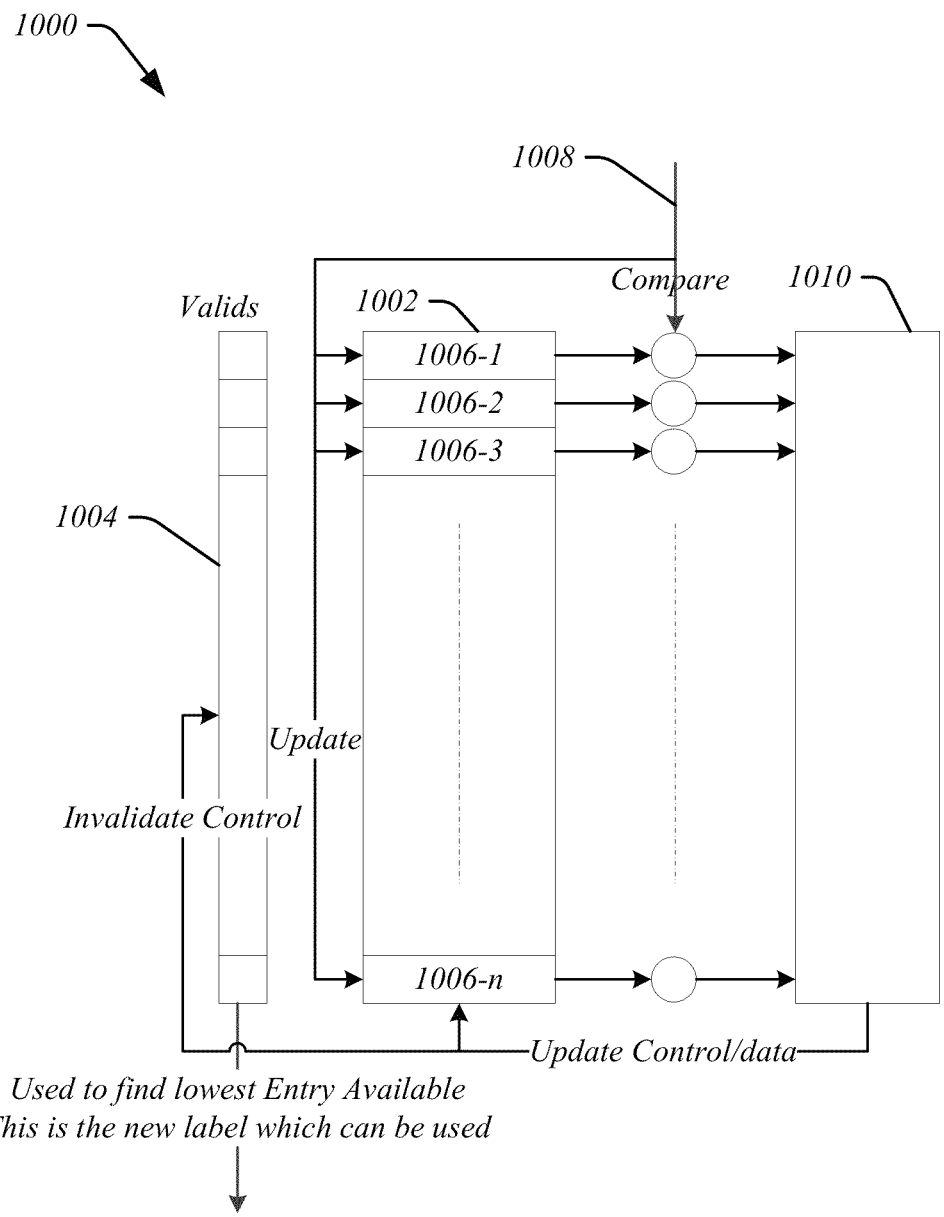
FIG. 10 illustrates a depiction of an exemplary architecture.

FIG. 10 illustrates a high level depiction of an exemplary CAM architecture for a LabelConnection buffer/cache 1000, which is suitable for use in connected component processing, especially under circumstances in which the number of labels used is very low. As illustrated, a storage 1002 contains the labels that are present in the LabelConnection buffer/cache 1000. A valid storage 1004 is provided that contains the valid labels of the image being processed. The storage 1002 may store labels 1006-1 to 1006-n. When the labels supported by storage 1002 reaches its limit, that is, when n reaches a value corresponding to a maximum amount of labels that can be supported, a compare signal 1008 is generated to read the labels 1006-1 to 1006-n so that the lowest label connected to each label 1006-1 to 1006-n can be determined. Each current label for which a corresponding lower label is identified is replaced with the lower label. An updated label storage 1010 then may list the updated labels. A control signal may then be sent to invalidate the valid storage 1004. In the invalidation process, previously stored labels may be freed up. As illustrated, the lowest level label that is now available after the label update process may be determined. This label may then be output from the label connection buffer/cache 1000 to indicate the lowest label that may be used as the labeling of the image continues.

Figure 11A:
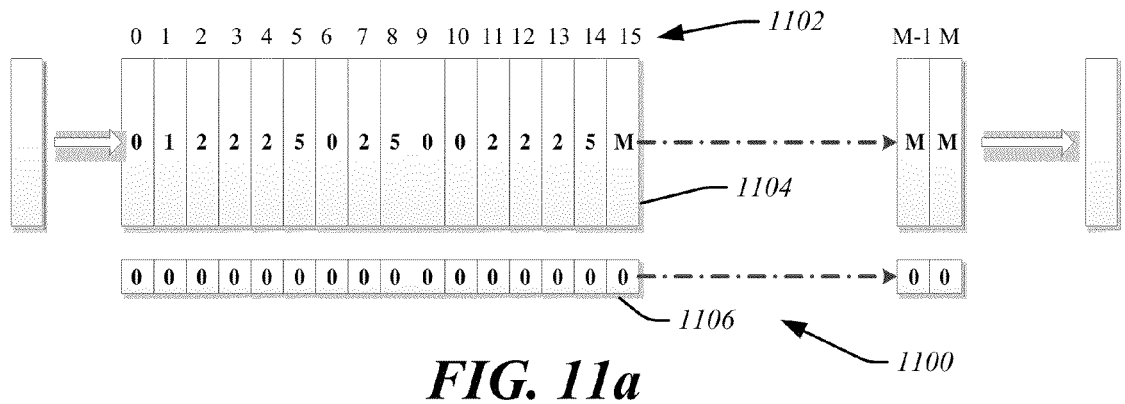
FIGS. 11a to 11e depict one example of operation of an exemplary buffer.

FIGS. 11a to 11e depict one example of operation of a CAM 1100 as a label connection buffer. In FIG. 11a, there is shown an initial or current state of the CAM 1100. As illustrated, the CAM 1100 includes a set of labels 1102 that are labeled "1" to "M" where M may be any non-zero integer greater than 1. The CAM 1100 also includes a set of root labels 1104, for each label 1102. Also shown in the CAM 1100 is a marker structure 1106 whose operation is discussed below. In the instance depicted in FIG. 11a, all the labels of the set of labels 1102 point to one of four "real" labels "0", "1," "2," or "5." All the unused labels are pointed to "M".

The FIGS. 11b to 11e depict a scenario in which it may be determined that the labels "7" and "14" are the same. In this case, an operation is performed to merge the labels 7 and 14.

Figure 11B:
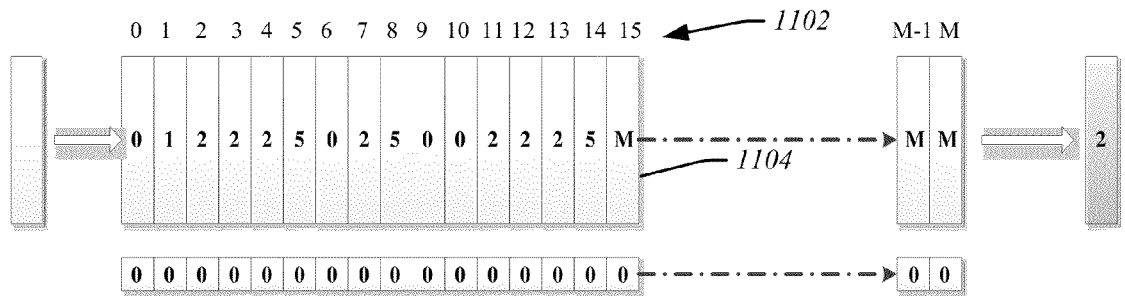
Figure 11C:
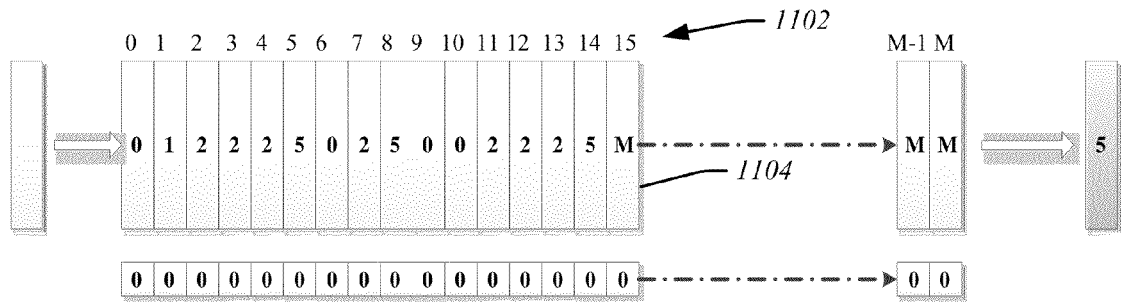

FIG. 11b depicts a subsequent operation in which the label 7 is merged with its lowest label or root label "2". Thus, the CAM 1100 outputs "2" for the label 7. FIG. 11c depicts a subsequent operation in which the label 14 is merged with its lowest label or root label "5". Thus, the CAM 1100 outputs "5" for the label 14.

Figure 11D:
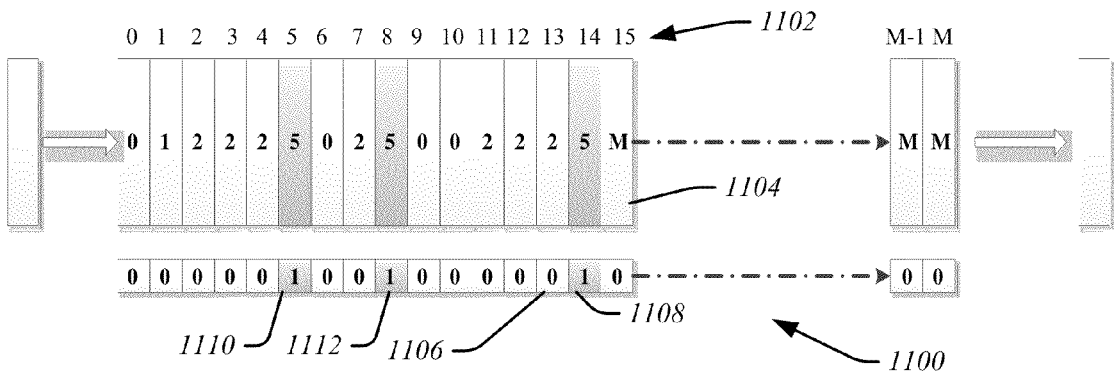
Figure 11E:
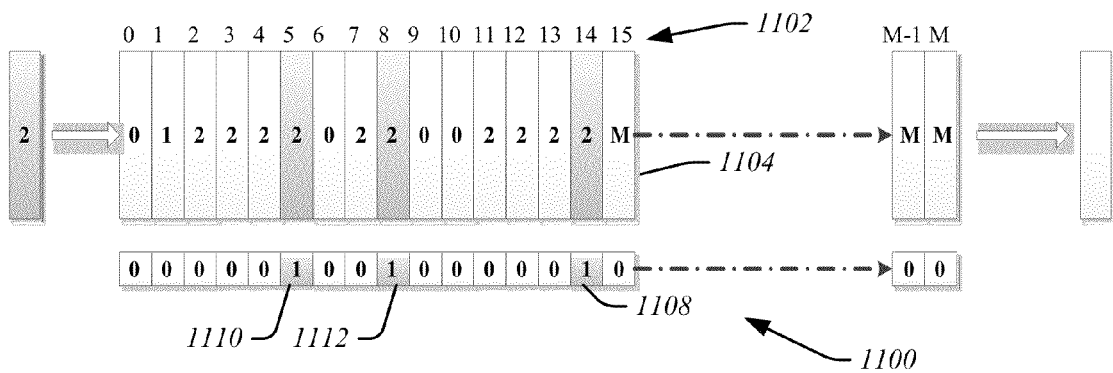

Subsequently, because the labels 7 and 14 have been determined to be the same, the root value of "5" for the label 14 may be replaced in the CAM 1100 with the root value "2" associated with label 7. The connected component module 106 may therefore determine that the label connection for label 14 is to be updated to reflect a root (lowest) label of "2." FIG. 11d depicts an instance in which the connected component module 106 sets a marker 1108 in the marker structure 1106 from a value of "0" to a value of "1" to indicate that the label 14 is to be updated to reflect the root value for label 7, or "2." In addition, any other labels having root values of "5" as for label 14 are marked for updating. Thus, a marker 1108 is set for label 5 and a marker 1112 is set for label 8. Subsequently, as shown in FIG. 11e, the set of root labels 1104 is updated so that entries for each of labels 5, 8, and 14 have the label 2. Accordingly, the label "5" may be freed up for use for image labeling by the connected component module 106.

Consistent with some embodiments, in cases where the amount of labels overflows the physical size of the CAM, the following procedure may be adopted. In each cell of a CAM array two bits that store the current state of the cell can be added. A cell in the CAM can be in one of three states: unused, root, or pointer to root. A priority encoder may be employed to enable finding of the address of the first cell of the CAM array that is in the "unused" state. Additionally, several bits may be added to each cell of the CAM array to store the level in which that cell's state was set. In one example, 4 bits may be provided allowing 16 iterations. The flow of a cell's states can only be: a→b→c→a.

In one example, the following may be performed. In an initialization procedure, a Level counter is set to "0," all CAM cell states are set to "unused," and all CAM cell level values are set to "0." A first pass may be run until there are no "unused" cells left. In the first pass, the priority encoder is used to find unused cells to store the next label. In addition, the label count is used as the MSB of the labels when comparing two labels. This means that a label set in an earlier level has a higher priority than one set in a later iteration.

When no unused cells are left, the following procedure is performed. The last row that was completed is redone, replacing all pixel labels with their equivalent root labels. The current LabelArray is stored to memory and the last completed row number. Cells designated "c" (pointer) are reset to "a" (free). The label count is incremented and stored to all free cells.

FIGS. 12a to 12f depict one example of operation of a CAM 1200 under conditions of label overflow. The CAM 1200 includes a set of state settings 1202 and level settings 1204. In the instance depicted at FIG. 12a an initial state is depicted in which label positions have been assigned and the labels 1206 are the same as the labels 1206. In the sequence depicted in FIGS. 12b to 12f, the operation of the CAM 1200 is depicted for a case in which three levels are used, in other words, the labels are used up twice. In FIG. 12b, an end of a level "0" is depicted in which labels 1206 reflect the lowest labels. In FIG. 12c, the CAM 1200 is depicted at the start of a level "1" in which the labels not marked as "b" are reset. FIG. 12d depicts an end of level "1" processing, while FIG. 12e depicts the beginning of a further level, level "2." Finally, FIG. 12f depicts the end of level "2" processing.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 13:
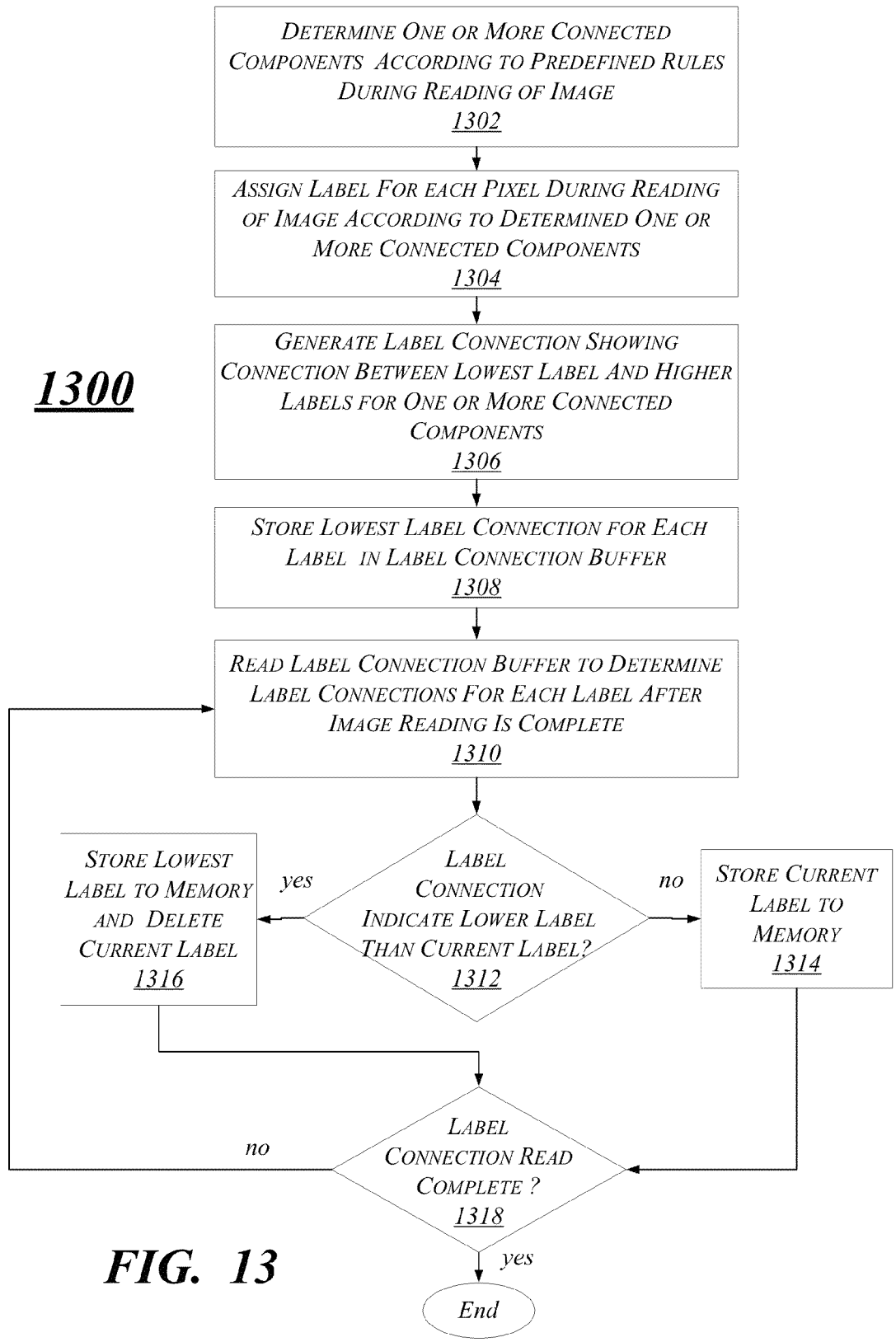
FIG. 13 depicts an exemplary first logic flow.

FIG. 13 depicts an exemplary first logic flow 1300. At block 1302, one or more connected components are determined according to predefined rules during reading of an image. In various examples, the determination may be based upon 4-connection or 8-connection between a given pixel and surrounding pixels. At block 1304, each pixel is assigned a label during the reading of the image according to the determined one or more connected component. Because pixels may be read in an order such as raster order, labeling may proceed to assign more than one label to the same connected component.

At block 1306, a label connection is generated for one or more connected components that shows the connection between a lowest label and higher labels for that pixel.

At block 1308, the lowest label connection for each label is stored in a buffer, such as a label connection buffer. At block 1310 the label connection buffer is read to determine label connections for each label after the image reading is complete.

The flow then moves to decision block 1312 where a determination is made for a given label as to whether the label connection information in the label connection buffer indicates a lower label than the current label. If not, the flow moves to block 1314 where the current label is stored to memory. If a lower label is indicated, the flow moves to block 1316 where the lowest label connected to the current label is stored to memory and the current (higher) label is deleted.

After the block 1316 or 1314, the flow moves to decision block 1318 where a determination is made as to whether the label connection read is complete. If so, the flow ends. If not, the flow returns to block 1310.

Figure 14:
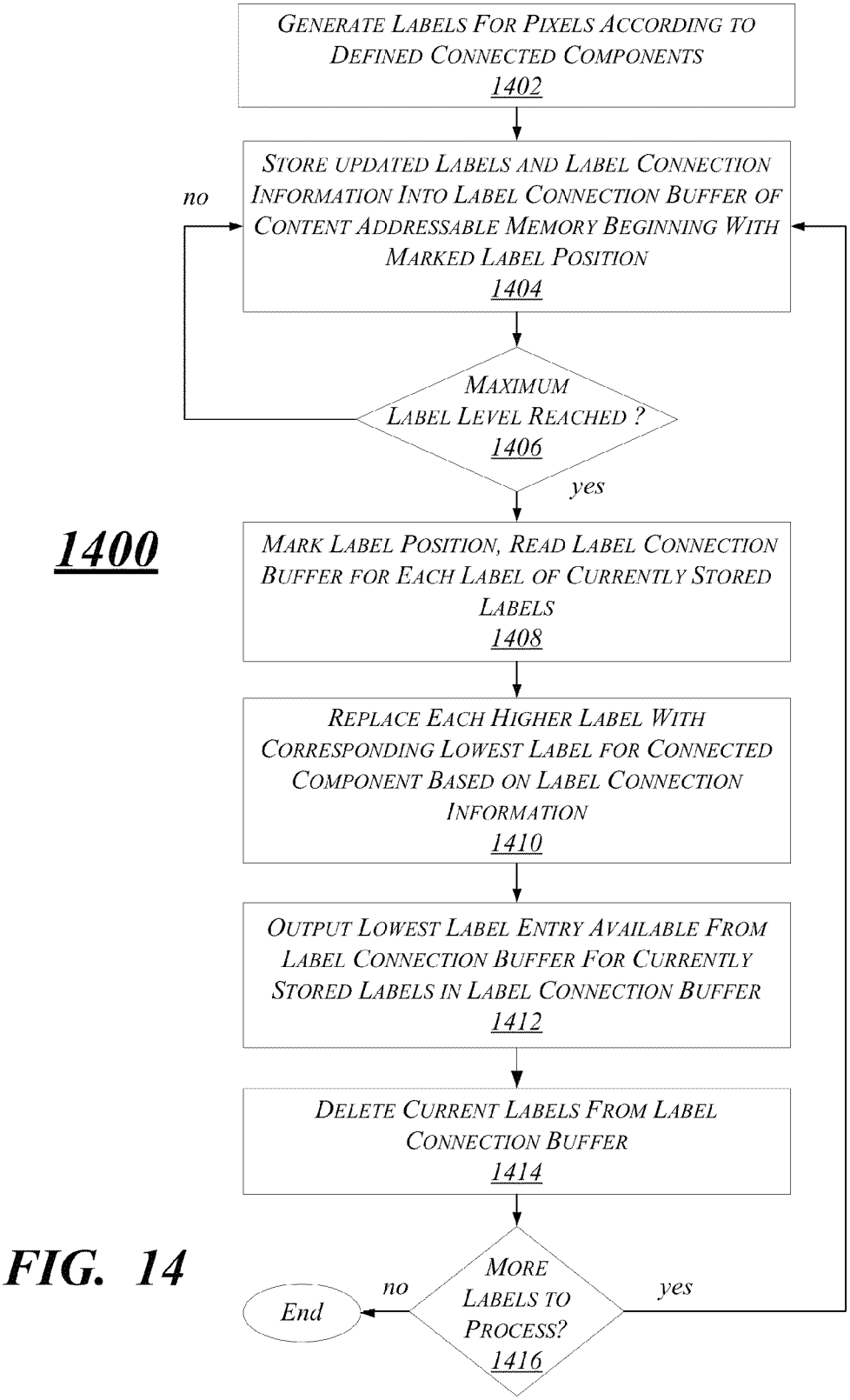
FIG. 14 depicts an exemplary second logic flow.

FIG. 14 depicts an exemplary second logic flow 1400. At block 1402, labels are generated for pixels during reading of an image. At block 1404, updated labels are stored into a buffer, such as a "label connection" buffer of a content addressable memory. Each updated label has associated label connection information that indicates any connection to other labels. The labels are read beginning with a marked label position. The flow then proceeds to block 1406 where a decision is made as to whether a maximum label level has been reached. If not, the flow returns to block 1404. If so, the flow proceeds to block 1408. At the block 1408, the label position is marked, and the label connection buffer is read for each label of the currently stored labels. At block 1410, each higher label is replaced with a corresponding lower label as indicated by the label connection information. At block 1412, after replacement of all the higher labels, the lowest label entry among the currently stored labels in the label connection buffer is output from the label connection buffer. At block 1414, the currently unused labels are deleted from the label connection buffer.

The flow then proceeds to block 1416 where a determination is made as to whether there are more labels to process. If not, the flow ends. If so, the flow returns to block 1404.

Thus, the present embodiments provide multiple advantages in comparison to conventional connected component analysis. For one, the architecture of a processor such as a graphics processor unit disclosed herein can support any procedure that determines connection to a surrounding pixel. When a connection is determined, the connection map can be sent as an input for processing by hardware. Secondly, during the image analysis, the image may be read in raster order and thus does not need to be read in a random order dependent on contour shape. This places a lower burden on cache and hence yields better performance. In addition, to generate a final output labeled image, the image and intermediate label map need only be read once. Moreover, because the lowest label connection is stored at the end of the first pass a considerable savings in bandwidth is realized in comparison to having to read the complete image multiple times depending on the number of contours. Because only the lowest label that the present label is connected to is stored, less storage takes place as compared to storing a complete listing of connection to all possible labels for a given label.

The present embodiments also generate a bounding box and point of a contour so that a contour edge can be extracted by a CPU as required. Because these procedures are implemented in a graphics processor (hardware) the image labeling process is also more power efficient. Finally, the use of a running buffer in conjunction with a small cache for implementation in a label connection buffer/cache and bounding box buffer/cache provides advantages when an image has many components and requires the use of many labels. In particular, the need for large memory in the semiconductor die is eliminated and the number of memory read/writes reduced in comparison to architectures that do not include such a buffer/cache system.

Figure 15:
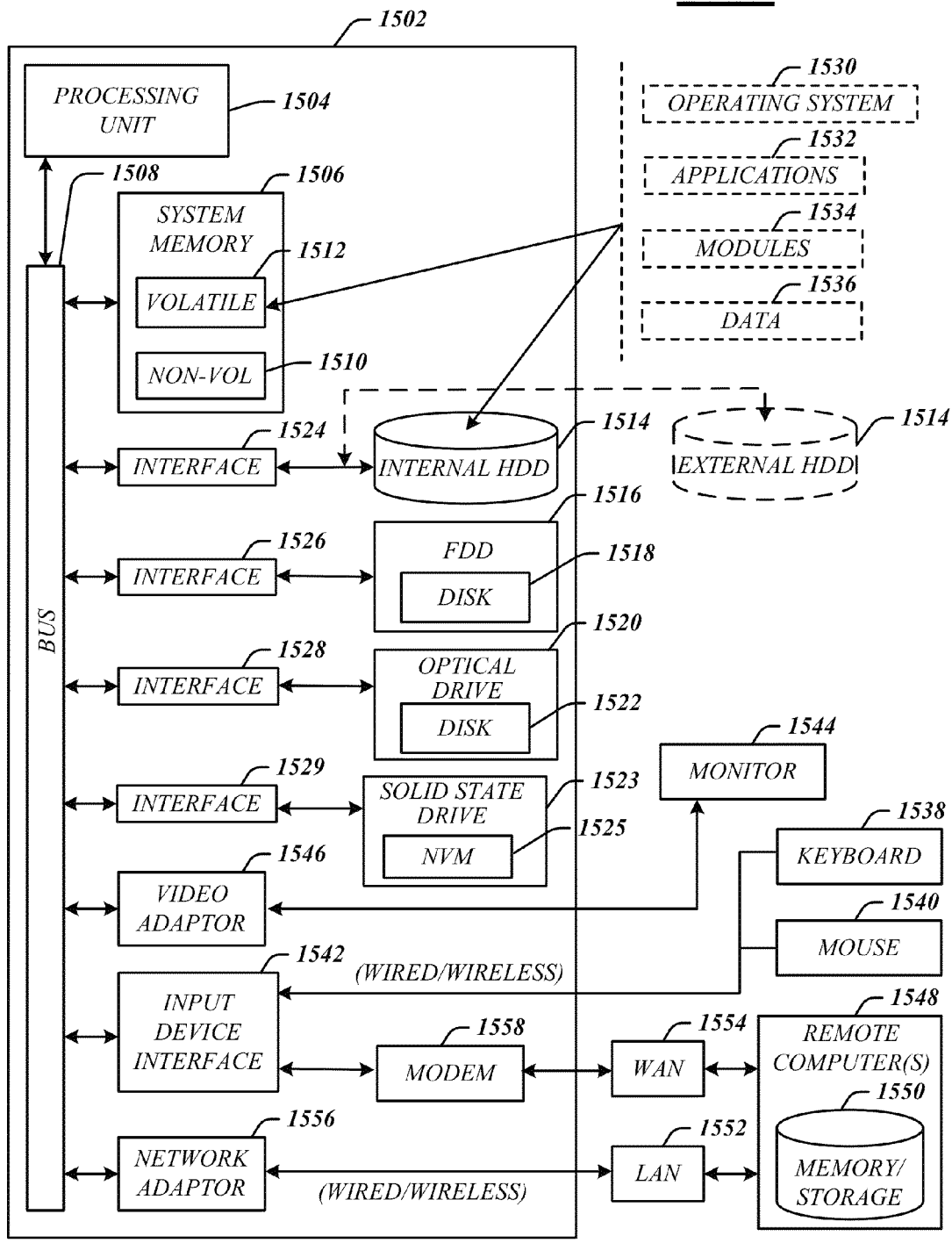
FIG. 15 is a diagram of an exemplary system embodiment.

FIG. 15 illustrates an embodiment of an exemplary computing architecture 1500 suitable for implementing various embodiments as previously described. As used in this application, the terms "system" and "component" are intended to refer to a computer-related entity, either hardware, a combination of hardware and software, software, or software in execution, examples of which are provided by the exemplary computing architecture 1500. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 1500 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 1500 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 1500.

As shown in FIG. 15, the computing architecture 1500 comprises a processing unit 1504, a system memory 1506 and a system bus 1508. The processing unit 1504 can be any of various commercially available processors. Dual microprocessors and other multi processor architectures may also be employed as the processing unit 1504. The system bus 1508 provides an interface for system components including, but not limited to, the system memory 1506 to the processing unit 1504. The system bus 1508 can be any of several types of bus structure that may further interconnect to a memory bus (with or without a memory controller), a peripheral bus, and a local bus using any of a variety of commercially available bus architectures.

The computing architecture 1500 may comprise or implement various articles of manufacture. An article of manufacture may comprise a computer-readable storage medium to store logic. Embodiments may also be at least partly implemented as instructions contained in or on a non-transitory computer-readable medium, which may be read and executed by one or more processors to enable performance of the operations described herein. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

The system memory 1506 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 15, the system memory 1506 can include non-volatile memory 1510 and/or volatile memory 1512. A basic input/output system (BIOS) can be stored in the non-volatile memory 1510.

The computer 1502 may include various types of computer-readable storage media in the form of one or more lower speed memory units, including an internal hard disk drive (HDD) 1514, a magnetic floppy disk drive (FDD) 1516 to read from or write to a removable magnetic disk 1518, and an optical disk drive 1520 to read from or write to a removable optical disk 1522 (e.g., a CD-ROM or DVD); and a solid state drive (SSD) 1523 to read or write data to/from a non-volatile memory (NVM) 1525, including a NAND flash memory, phase change memory (PCM), a spin memory; phase change memory with switch (PCMS), magnetoresistive random access memory (MRAM), spin memory, nanowire memory, ferroelectric transistor random access memory (FeTRAM). The HDD 1514, FDD 1516, optical disk drive 1520, and solid state drive 1523 can be connected to the system bus 1508 by a HDD interface 1524, an FDD interface 1526, an optical drive interface 1528, and a solid state drive interface 1529, respectively. The HDD interface 1524 for external drive implementations can include at least one or both of Universal Serial Bus (USB) and IEEE 1594 interface technologies. The solid state drive interface 1529 may comprise any suitable interface for coupling to the host device, such as, for example, but not limited to, a serial advanced technology attachment (SATA) interface, a serial attached SCSI (SAS) interface, a universal serial bus (USB) interface, a peripheral control interface (PCI), or other suitable device interface.

The drives and associated computer-readable media provide volatile and/or nonvolatile storage of data, data structures, computer-executable instructions, and so forth. For example, a number of program modules can be stored in the drives and memory units 1510, 1512, including an operating system 1530, one or more application programs 1532, other program modules 1534, and program data 1536.

A user can enter commands and information into the computer 1502 through one or more wire/wireless input devices, for example, a keyboard 1538 and a pointing device, such as a mouse 1540. Other input devices may include a microphone, an infra-red (IR) remote control, a joystick, a game pad, a stylus pen, touch screen, or the like. These and other input devices are often connected to the processing unit 1504 through an input device interface 1542 that is coupled to the system bus 1508, but can be connected by other interfaces such as a parallel port, IEEE 1594 serial port, a game port, a USB port, an IR interface, and so forth.

A monitor 1544 or other type of display device is also connected to the system bus 1508 via an interface, such as a video adaptor 1546. In addition to the monitor 1544, a computer typically includes other peripheral output devices, such as speakers, printers, and so forth.

The computer 1502 may operate in a networked environment using logical connections via wire and/or wireless communications to one or more remote computers, such as a remote computer 1548. The remote computer 1548 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1550 is illustrated. The logical connections depicted include wire/wireless connectivity to a local area network (LAN) 1552 and/or larger networks, for example, a wide area network (WAN) 1554. Such LAN and WAN networking environments are commonplace in offices and companies, and facilitate enterprise-wide computer networks, such as intranets, all of which may connect to a global communications network, for example, the Internet.

When used in a LAN networking environment, the computer 1502 is connected to the LAN 1552 through a wire and/or wireless communication network interface or adaptor 1556. The adaptor 1556 can facilitate wire and/or wireless communications to the LAN 1552, which may also include a wireless access point disposed thereon for communicating with the wireless functionality of the adaptor 1556.

When used in a WAN networking environment, the computer 1502 can include a modem 1558, or is connected to a communications server on the WAN 1554, or has other means for establishing communications over the WAN 1554, such as by way of the Internet. The modem 1558, which can be internal or external and a wire and/or wireless device, connects to the system bus 1508 via the input device interface 1542. In a networked environment, program modules depicted relative to the computer 1502, or portions thereof, can be stored in the remote memory/storage device 1550. It will be appreciated that the network connections shown are exemplary and other means of establishing a communications link between the computers can be used.

The computer 1502 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

In one embodiment, an apparatus may include a memory, a processor circuit coupled to the memory, and connected component labeling module. The connected component labeling module may be operative of the processor circuit to determine one or more connected components during reading of an image comprising a multiplicity of pixels from the memory, to assign a label to a plurality of pixels of the multiplicity of pixels, to generate one or more label connections for a respective one or more labels, where each label connection links a higher label to a lowest label for the same connected component, and to write to the memory for each label of the one or more labels a lowest label as defined by the label connection for the each label after a label is assigned to each pixel.

In another embodiment the. the connected component labeling module may be operative on the processor circuit to generate one or more bounding boxes for the respective one or more labels after the updating the label connection Alternatively, or in addition, in a further embodiment, the apparatus may include a label connection buffer operative to store the one or more label connections, and a bounding box buffer operative to store the one or more bounding boxes.

Alternatively, or in addition, in a further embodiment the label connection buffer may include a running buffer to store one or more label connections for respective one or more labels currently in use, and a cache to cache label connections not stored in the running buffer.

Alternatively, or in addition, in a further embodiment the bounding box buffer may include a running buffer to store one or more bounding boxes for a respective one or more labels currently in use, the apparatus, and a cache to cache bounding boxes not stored in the running buffer.

Alternatively, or in addition, in a further embodiment the connected component labeling module may be operative on the processor circuit to determine a position of an edge of a contour of the one or more labels.

Alternatively, or in addition, in a further embodiment the connected component labeling module may be operative on the processor circuit to generate an X,Y coordinate set for an upper left corner of the contour, and to save the X-Y coordinate set to the memory.

Alternatively, or in addition, in a further embodiment the connected component labeling module may be operative on the processor circuit to read the one or more label connections after a label is assigned to each pixel, to save to the memory only a lowest label for each label according to the label connection for that label, and to delete from the memory any label that is higher than the lowest label for the each label.

Alternatively, or in addition, in a further embodiment the apparatus may include a content addressable memory having a running buffer operative to temporarily store the one or more label connections and respective one or more updated labels.

Alternatively, or in addition, in a further embodiment the connected component labeling module may be operative on the processor circuit to read the label connections from the running buffer when a maximum number of updated labels supported by the content addressable memory is reached, to mark a label position corresponding to labels updated, and to output a lowest label available for currently stored labels in the running buffer.

Alternatively, or in addition, in a further embodiment the apparatus may include a digital display operative to present the image.

In a further embodiment, a computer implemented method may include determining one or more connected components during reading of an image comprising a multiplicity of pixels from memory, assigning a label to a plurality of pixels of the multiplicity of pixels, generating one or more label connections for a respective one or more labels, each label connection linking a higher label to a lowest label for the same connected component, and writing to the memory for each label of the one or more labels a lowest label as defined by the label connection for the each label after a label is assigned to each pixel.

In a further embodiment, the computer implemented method may include generating one or more bounding boxes for the respective one or more labels after the updating the label connection.

Alternatively, or in addition, in a further embodiment, the computer implemented method may comprise storing one or more label connections in a first buffer, and storing the one or more bounding boxes in a second buffer.

Alternatively, or in addition, in a further embodiment, the computer implemented method may comprise storing one or more label connections for respective one or more labels currently in use in a first running buffer, and caching label connections not stored in the first running buffer.

Alternatively, or in addition, in a further embodiment, the computer implemented method may comprise storing one or more bounding boxes for respective one or more labels currently in use in a second running buffer, and caching label connections not stored in the second running buffer.

Alternatively, or in addition, in a further embodiment, the computer implemented method may comprise determining a position of an edge of a contour of the one or more labels.

Alternatively, or in addition, in a further embodiment, the computer implemented method may comprise generating an X,Y coordinate set for an upper left corner of the contour; and save the X-Y coordinate set to the memory.

Alternatively, or in addition, in a further embodiment, the computer implemented method may comprise reading the one or more label connections after a label is assigned to each pixel, saving to the memory only a lowest label for each label according to the label connection for that label, and deleting from the memory any label that is higher than the lowest label for the each label.

Alternatively, or in addition, in a further embodiment, the computer implemented method may comprise reading the label connections from a running buffer of a content addressable memory when a maximum number of updated labels supported by the content addressable memory is reached, marking a label position corresponding to labels updated, and outputting a lowest label available for currently stored labels in the running buffer.

In a further embodiment, an apparatus may be configured to perform the method of any one of the preceding embodiments.

In another embodiment, at least one machine readable medium may comprise a plurality of instructions that in response to being executed on a computing device, cause the computing device to carry out a method according to any one of the preceding embodiments.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a computer-readable medium or article which may store an instruction or a set of instructions that, if executed by a computer, may cause the computer to perform a method and/or operations in accordance with the embodiments. Such a computer may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
a memory;
a processor circuit coupled to the memory; and
a connected component labeling module operative of the processor circuit to:
  determine one or more connected components during reading of an image comprising a multiplicity of pixels from the memory;
  assign a label to a plurality of pixels of the multiplicity of pixels;
  generate one or more label connections for a respective one or more labels, each label connection linking a higher label to a lowest label for the same connected component;
  write to the memory for each label of the one or more labels a lowest label as defined by the label connection for the each label after a label is assigned to each pixel;
  read the label connections from a running buffer when a maximum number of updated labels supported by the running buffer is reached;
  mark a label position corresponding to labels updated; and
  determine a lowest label available for currently stored labels in the running buffer.

2. The apparatus of claim 1, the connected component labeling module operative on the processor circuit to generate one or more bounding boxes for the respective one or more labels after updating the label connection.

3. The apparatus of claim 2, comprising:
a label connection buffer operative to store the one or more label connections; and
a bounding box buffer operative to store the one or more bounding boxes.

4. The apparatus of claim 3, the label connection buffer comprising:
a running buffer to store one or more label connections for respective one or more labels currently in use; and
a cache to cache label connections not stored in the running buffer.

5. The apparatus of claim 3, the bounding box buffer comprising:
another running buffer to store one or more bounding boxes for a respective one or more labels currently in use, the apparatus; and
a cache to cache bounding boxes not stored in the other running buffer.

6. The apparatus of claim 1, the connected component labeling module operative on the processor circuit to determine a position of an edge of a contour of the one or more labels.

7. The apparatus of claim 1, the connected component labeling module operative on the processor circuit to:
read the one or more label connections after a label is assigned to each pixel;
save to the memory only a lowest label for each label according to the label connection for that label; and
delete from the memory any label that is higher than the lowest label for the each label.

8. The apparatus of claim 1, comprising a content addressable memory to implement the running buffer, the running buffer operative to temporarily store the one or more label connections and respective one or more updated labels.

9. The apparatus of claim 1, comprising a digital display operative to present the image.

10. At least one non-transitory computer-readable storage medium comprising a plurality of instructions that, when executed, cause a system to:
- determine one or more connected components during reading of an image comprising a multiplicity of pixels from the memory;
- assign a label to a plurality of pixels of the multiplicity of pixels;
- generate one or more label connections for a respective one or more labels, each label connection linking a higher label to a lowest label for the same connected component;
- write to the memory for each label of the one or more labels a lowest label as defined by the label connection for the each label after a label is assigned to each pixel;
- read the label connections from a running buffer when a maximum number of updated labels supported by the running buffer is reached;
- mark a label position corresponding to labels updated; and
- determine a lowest label available for currently stored labels in the running buffer.

11. The at least one non-transitory computer-readable storage medium of claim 10 comprising instructions that, when executed, cause a system to generate one or more bounding boxes for the respective one or more labels after updating the label connection.

12. The at least one non-transitory computer-readable storage medium of claim 10 comprising instructions that, when executed, cause a system to store the one or more label connections and the one or more bounding boxes.

13. The at least one non-transitory computer-readable storage medium of claim 10 comprising instructions that, when executed, cause a system to:
- store in the running buffer one or more label connections for respective one or more labels currently in use; and
- cache label connections not stored in the running buffer.

14. The at least one non-transitory computer-readable storage medium of claim 10 comprising instructions that, when executed, cause a system to:
- store in another running buffer one or more bounding boxes for respective one or more labels currently in use; and
- cache bounding boxes not stored in the other running buffer.

15. The at least one non-transitory computer-readable storage medium of claim 10 comprising instructions that, when executed, cause a system to determine a position of an edge of a contour of the one or more labels.

16. The at least one non-transitory computer-readable storage medium of claim 10 comprising instructions that, when executed, cause a system to:
- read the one or more label connections after a label is assigned to each pixel;
- save to the memory only a lowest label for each label according to the label connection for that label; and
- delete from the memory any label that is higher than the lowest label for the each label.

17. The at least one non-transitory computer-readable storage medium of claim 10 comprising instructions that, when executed, cause a system to temporarily store the one or more label connections and respective one or more updated labels in the running buffer, the running buffer, the running buffer being implemented by a content addressable memory.

18. A computer-implemented method, comprising:
- determining one or more connected components during reading of an image comprising a multiplicity of pixels from memory;
- assigning a label to a plurality of pixels of the multiplicity of pixels;
- generating one or more label connections for a respective one or more labels, each label connection linking a higher label to a lowest label for the same connected component;
- writing to the memory for each label of the one or more labels a lowest label as defined by the label connection for the each label after a label is assigned to each pixel;
- reading the label connections from a running buffer when a maximum number of updated labels supported by the running buffer is reached;
- marking a label position corresponding to labels updated; and
- determining a lowest label available for currently stored labels in the running buffer.

19. The computer implemented method of claim 18 comprising generating one or more bounding boxes for the respective one or more labels after updating the label connection.

20. The computer implemented method of claim 18, comprising:
- storing one or more label connections in a first buffer; and
- storing the one or more bounding boxes in a second buffer.

21. The computer implemented method of claim 18 comprising:
- storing one or more label connections for respective one or more labels currently in use in the running buffer; and
- caching label connections not stored in the running buffer.

22. The computer implemented method of claim 18 comprising:
- storing one or more bounding boxes for respective one or more labels currently in use in another running buffer; and
- caching label connections not stored in the other running buffer.

23. The computer implemented method of claim 18 comprising determining a position of an edge of a contour of the one or more labels.

24. The computer implemented method of claim 18 comprising:
- reading the one or more label connections after a label is assigned to each pixel;
- saving to the memory only a lowest label for each label according to the label connection for that label; and
- deleting from the memory any label that is higher than the lowest label for the each label.

* * * * *